United States Patent
Healey et al.

(10) Patent No.: US 7,853,392 B2
(45) Date of Patent: Dec. 14, 2010

(54) SYSTEMS AND METHODS FOR INITIALIZING DYNAMIC MODEL STATES USING A KALMAN FILTER

(75) Inventors: Timothy Andrew Healey, Simpsonville, SC (US); Randy S. Rosson, Simpsonville, SC (US); Kevin Wood Wilkes, Greenville, SC (US)

(73) Assignee: General Electric Company, Schenectady, NY (US)

( * ) Notice: Subject to any disclaimer, the term of this patent is extended or adjusted under 35 U.S.C. 154(b) by 977 days.

(21) Appl. No.: 11/627,534

(22) Filed: Jan. 26, 2007

(65) Prior Publication Data
US 2008/0178600 A1    Jul. 31, 2008

(51) Int. Cl.
*G06F 19/00* (2006.01)
(52) U.S. Cl. ..................................... 701/100
(58) Field of Classification Search ................... 701/99, 701/100; 60/772, 773
See application file for complete search history.

(56) References Cited

U.S. PATENT DOCUMENTS

| | | | |
|---|---|---|---|
| 6,823,253 B2 | 11/2004 | Brunell | |
| 6,823,675 B2 * | 11/2004 | Brunell et al. | ............... 60/773 |
| 7,503,177 B2 | 3/2009 | Bland et al. | |
| 7,584,617 B2 | 9/2009 | Bland et al. | |
| 7,620,461 B2 | 11/2009 | Frederick, II et al. | |
| 2004/0211187 A1 | 10/2004 | Catharine et al. | |
| 2005/0193739 A1 | 9/2005 | Brunell et al. | |
| 2006/0248893 A1 | 11/2006 | Mick et al. | |
| 2007/0062196 A1 | 3/2007 | Gleeson et al. | |
| 2007/0214796 A1 | 9/2007 | Bland et al. | |
| 2009/0005952 A1 | 1/2009 | Tonno et al. | |

\* cited by examiner

*Primary Examiner*—Kim T Nguyen
(74) *Attorney, Agent, or Firm*—Sutherland Asbill & Brennan LLP

(57) ABSTRACT

Embodiments of the invention can provide systems and methods for initializing dynamic model states using a Kalman or similar type filter. In one embodiment, a system for controlling a gas turbine engine is provided. The system can include at least one sensor adapted to obtain dynamic-type information about a current state of the engine. The system can also include an engine model adapted to receive information from the sensor, and further adapted to reflect the current state of the engine. Furthermore, the system can include a model filter adapted to initialize the engine model with at least a portion of the dynamic-type information, wherein at least one value based at least in part on the filtered dynamic-type information is input to the engine model to determine an engine control action.

23 Claims, 14 Drawing Sheets

ARES Heat Soak Model - Initialization

Reference Input Values tau_ref    time constant for each thermal node (currently 3)
hA_ref    convection cooling coefficient* wetted area
tf_ref     fluid (gas path) temperatures at reference conditions
wf_ref    mass flow at reference conditions hA, tau scaled to reference conditions as f (Re, Nu)

$$\frac{hA}{hA_{ref}} = \left(\frac{w}{w_{ref}}\right)^{0.80} \left(\frac{Tf}{Tf_{ref}}\right)^{0.84}$$

$$\tau = \frac{hA_{ref}}{hA} \tau_{ref}$$

Initialize Metal Temperature, To, by tuning Qdot holding input constant $$T_0 = T_f + \frac{\dot{Q}}{hA}$$

Case studies used to determine optimum parameters for initialization
Tmetal initialization takes 50 scans (2s)

FIG. 6

SYSTEMS AND METHODS FOR INITIALIZING DYNAMIC MODEL STATES USING A KALMAN FILTER

FIELD OF THE INVENTION

The invention relates to gas turbine modeling, and more particularly, to systems and methods for initializing dynamic model states using a Kalman or similar type filter.

BACKGROUND OF THE INVENTION

Design and operation of a combustion system in a rotary machine such as a gas turbine engine can be complex. To design and operate such engines, conventional models can be used to predict performance parameters for various engine components including the static and dynamic states of the engine. An example of a dynamic state of a gas turbine engine is the thermal energy stored in a component of the gas turbine engine, such as the rotor, blade, or casing. In some instances, conventional models require the initialization of one or more performance parameters prior to generating a prediction of other performance parameters.

For instance, a typical approach can be to initialize a thermal state for a model by selecting a point in time when heat flux is approximately zero, or when the gas turbine engine is thermally stable. Practical experience can indicate that approximately 30-60 minutes of operation at a predetermined load setting may be needed to achieve thermal stability or equilibrium. In any instance, if the true dynamic state is not accurately initialized, there may be residual errors in the modeling of other performance parameters. Depending on the amount of such errors, these errors may take a corresponding amount of time to decay during operation of the model and the engine.

Thus, there is a need for adaptive control systems and methods. There is yet a further need for adaptive systems and methods wherein the control system can update itself in real-time. There is also a need for adaptive systems and methods that can be automated using a computer. Furthermore, there is a need for adaptive control systems and methods for controlling gas turbine engines, such as the gas turbine engines in an aircraft engine, power plant, marine propulsion, or industrial application.

SUMMARY OF THE INVENTION

Embodiments of the invention can address some or all of the needs described above. Embodiments of the invention are directed generally to systems and methods for initializing and configuring dynamic model states using a Kalman or similar type filter to match the measured performance of a gas turbine engine. According to one embodiment of the invention, a system can include a model with at least one filter adapted to initialize at least one dynamic state of the model to match at least one performance measurement of an associated engine. The system can also include at least one controller adapted to generate a command for the associated engine based at least in part on the initialized model.

According to one aspect of the invention, a filter can be a Kalman filter.

According to another aspect of the invention, a model can include a heat soak model.

According to another aspect of the invention, a dynamic state of the model can be the heat flux state of the model.

According to an embodiment of the invention, a method for controlling a gas turbine engine can include obtaining dynamic-type information associated with a current state of an engine. The method can also include initializing an engine model with at least a portion of the dynamic-type information, wherein at least one value based at least in part on the dynamic-type information is input to the engine model. Furthermore, the method can include based at least in part on at least one value, determining the current state of the engine from the model. In addition, the method can include based at least in part on the state of the engine, determining an engine control action. Moreover, the method can include outputting a control command to implement the engine control action.

In one aspect of the invention, dynamic-type information can include at least one of the following: a temperature, a pressure, a temperature difference between at least two points in the engine, exhaust temperature, or compressor exit temperature.

In another aspect of the invention, obtaining dynamic-type information associated with a current state of an engine can include obtaining information about at least one of: the engine, an engine component, an engine system, an engine system component, an engine control system, an engine control system component, a gas path in the engine, gas path dynamics, an actuator, an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault a mechanical failure, an electrical failure, a chemical failure, mechanical damage, electrical damage, chemical damage, a system fault, a system failure, and system damage.

In yet another aspect of the invention, the engine model can include an adaptive real-time engine simulation model.

In a further aspect of the invention, the model filter can include a Kalman filter.

Furthermore, in another aspect of the invention, initializing an engine model with at least a portion of the dynamic-type information can include inputting at least one measured performance value to the engine model.

In another aspect of the invention, initializing an engine model with at least a portion of the dynamic-type information can include implementing a Kalman filter.

In another aspect of the invention, the method can include repeating at least a portion of the prior steps, wherein additional dynamic-type information is input to the engine model to improve engine control.

A further aspect of the invention can include performing the method automatically by a computer.

According to an embodiment of the invention, an adaptable model-based control system for controlling a gas turbine engine can include at least one sensor adapted to obtain dynamic-type information about a current state of the engine. In addition, the system can include an engine model adapted to receive information from the sensor, and further adapted to reflect the current state of the engine. The system can also include a model filter adapted to initialize the model with at least a portion of the dynamic-type information, wherein at least one value based at least in part on the dynamic-type information is input to the engine model. Furthermore, the model can be further adapted to determine an output from the engine model based at least in part on at least one value. Moreover, the system can include a controller adapted to determine an engine control action based at least in part on the output from the engine model, and further adapted to output a control command to implement the engine control action.

In one aspect of the invention, dynamic-type information can include at least one of the following: a temperature, a pressure, a temperature difference between at least two points in the engine, exhaust temperature, or compressor exit temperature.

In yet another aspect of the invention, dynamic-type information about a current state of the engine can include information about at least one of: the engine, an engine component, an engine system, an engine system component, an engine control system, an engine control system component, a gas path in the engine, gas path dynamics, an actuator, an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault, a mechanical failure, an electrical failure, a chemical failure, mechanical damage, electrical damage, chemical damage, a system fault, a system failure, and system damage.

In another aspect of the invention, the engine model can include an adaptive real-time engine simulation model.

In another aspect of the invention, the at least one value based at least in part on the dynamic-type information can include at least one measured performance value.

In yet another aspect of the invention, the model can be further adapted to repeat at least a portion of the prior steps, wherein additional dynamic-type information is input to the engine model to improve engine control.

In another aspect of the invention, model can be automatically implemented by a computer.

According to an embodiment of the invention, an adaptable model-based control system adapted to control a gas turbine engine can include at least one model adapted to represent performance of a gas turbine engine.

In one aspect of the invention, at least one estimator can be adapted to determine a current state of the engine and can be further adapted to initialize the model with dynamic-type information.

In another aspect of the invention, at least one model-based control can be adapted to utilize an output from the estimator and to provide at least one control command to the gas turbine engine.

In another aspect of the invention, dynamic-type information can include at least one of the following: a temperature, a pressure, a temperature difference between at least two points in the engine, exhaust temperature, or compressor exit temperature.

In another aspect of the invention, dynamic-type information can include information about at least one of: the engine, an engine component, an engine system, an engine system component, an engine control system, an engine control system component, a gas path in the engine, gas path dynamics, an actuator, an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault, a mechanical failure, an electrical failure, a chemical failure, mechanical damage, electrical damage, chemical damage, a system fault, a system failure, and system damage.

Furthermore, in another aspect of the invention, the model can include an adaptive real-time engine simulation model.

In another aspect of the invention, the model is further adapted to repeat at least a portion of the prior steps, wherein additional dynamic-type information is input to the engine model to improve engine control.

In a further aspect of the invention, the estimator can include a Kalman filter.

In another aspect of the invention, the adaptable model-based control system is automatically implemented by a computer.

BRIEF DESCRIPTION OF THE DRAWINGS

Figure 1:
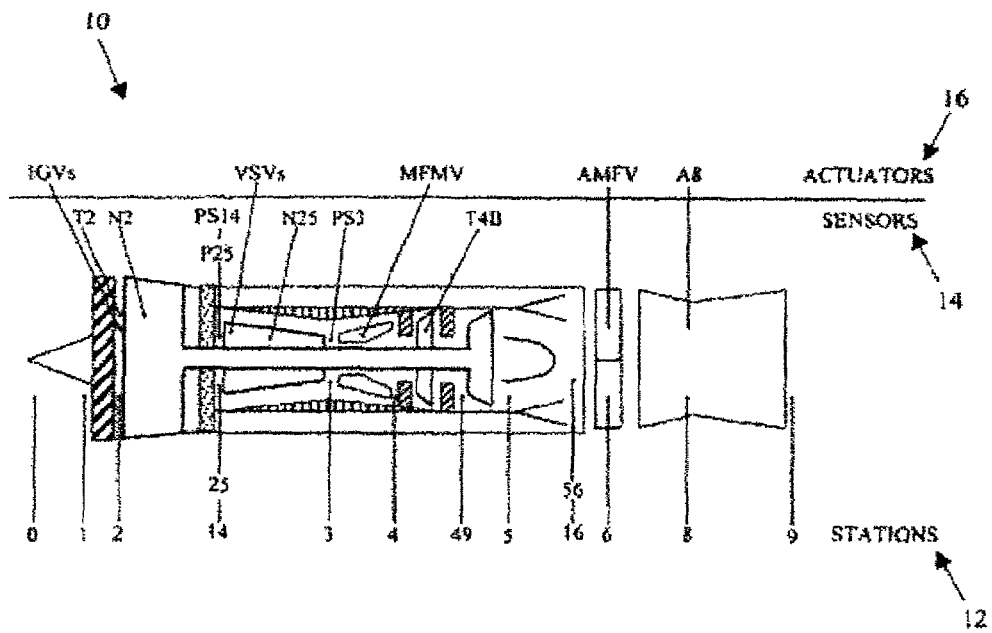

Having thus described the invention in general terms, reference will now be made to the accompanying drawings, which are not necessarily drawn to scale, and wherein:

FIG. 1 is schematic diagram showing the layout of an example gas turbine engine that may be controlled by an embodiment of this invention.

Figure 2:
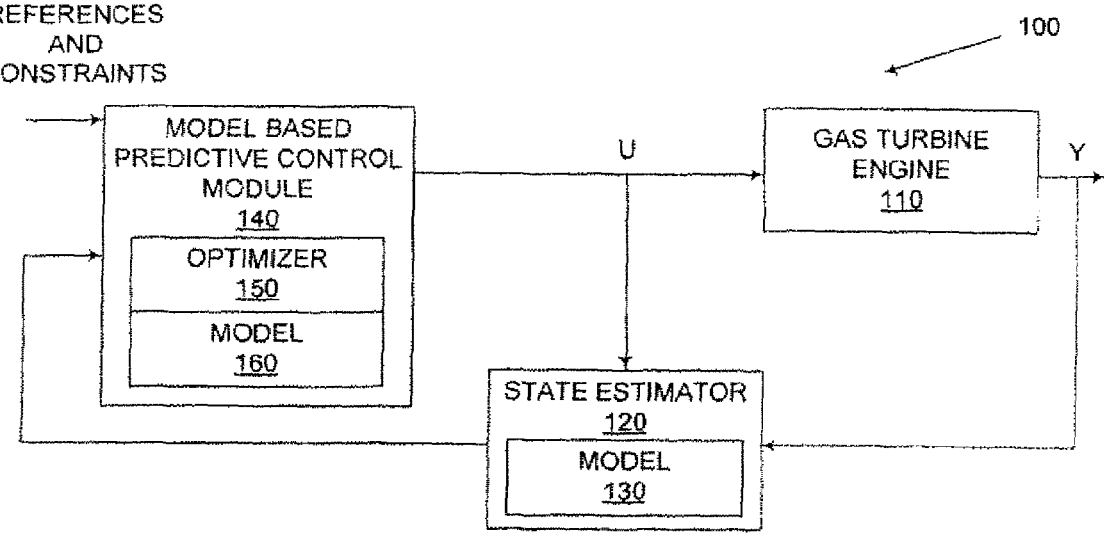

FIG. 2 is a block diagram illustrating components of an adaptive engine control system according to an embodiment of the invention.

Figure 3:
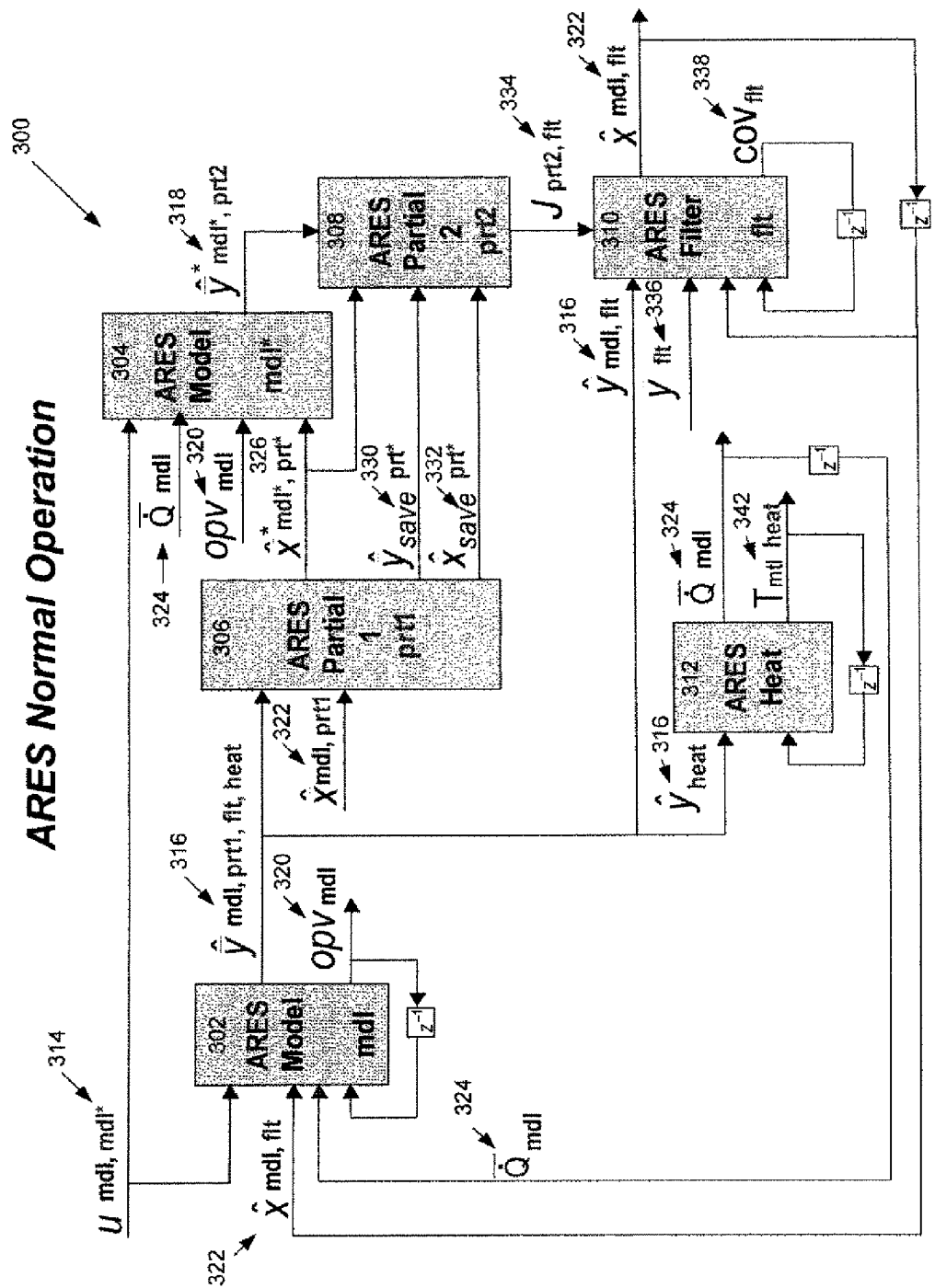

FIG. 3 is a block diagram illustrating an example model during normal execution according to one embodiment of the invention.

Figure 4:
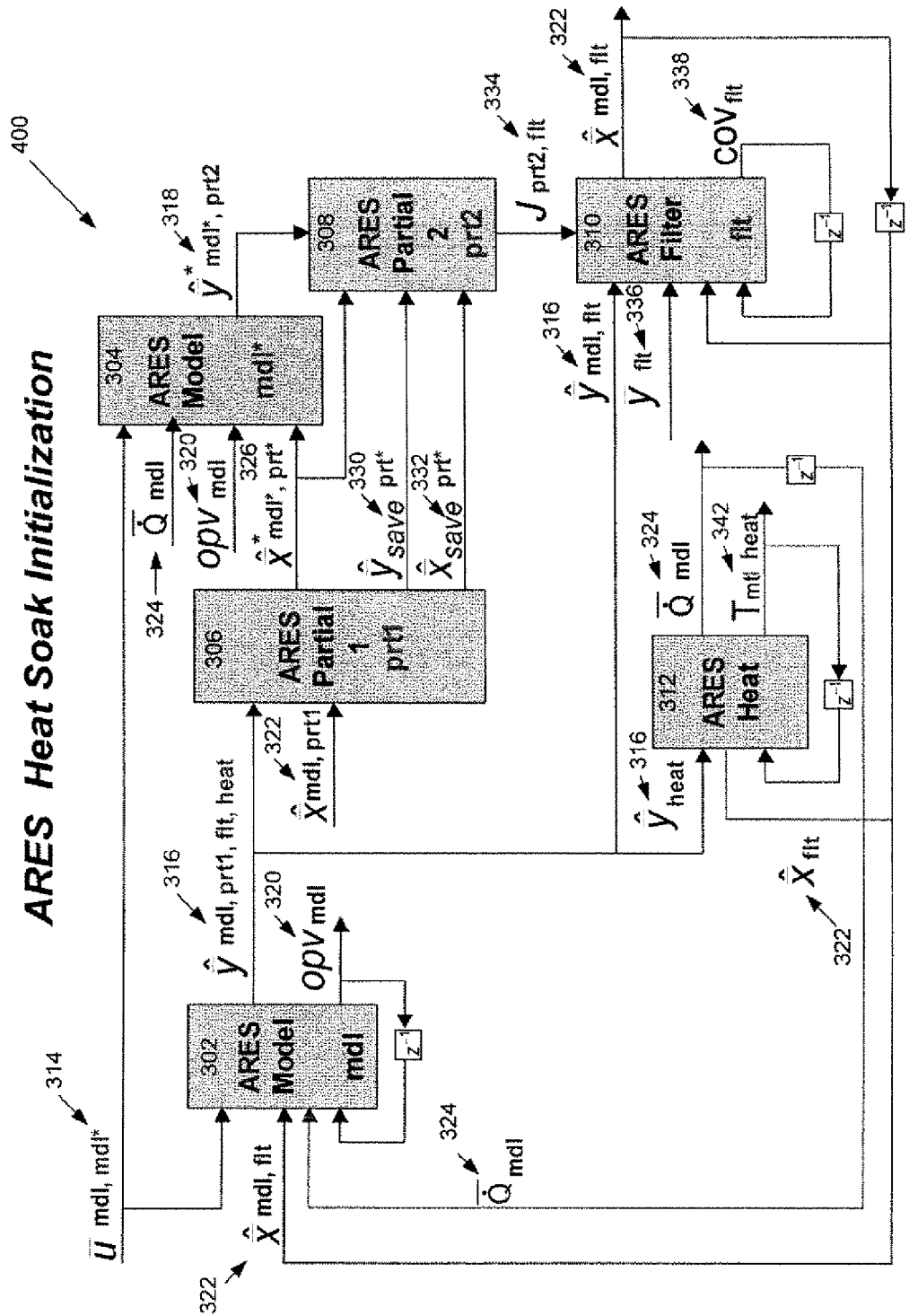

FIG. 4 a block diagram illustrating an example model during dynamic configuration according to one embodiment of the invention.

Figure 5:
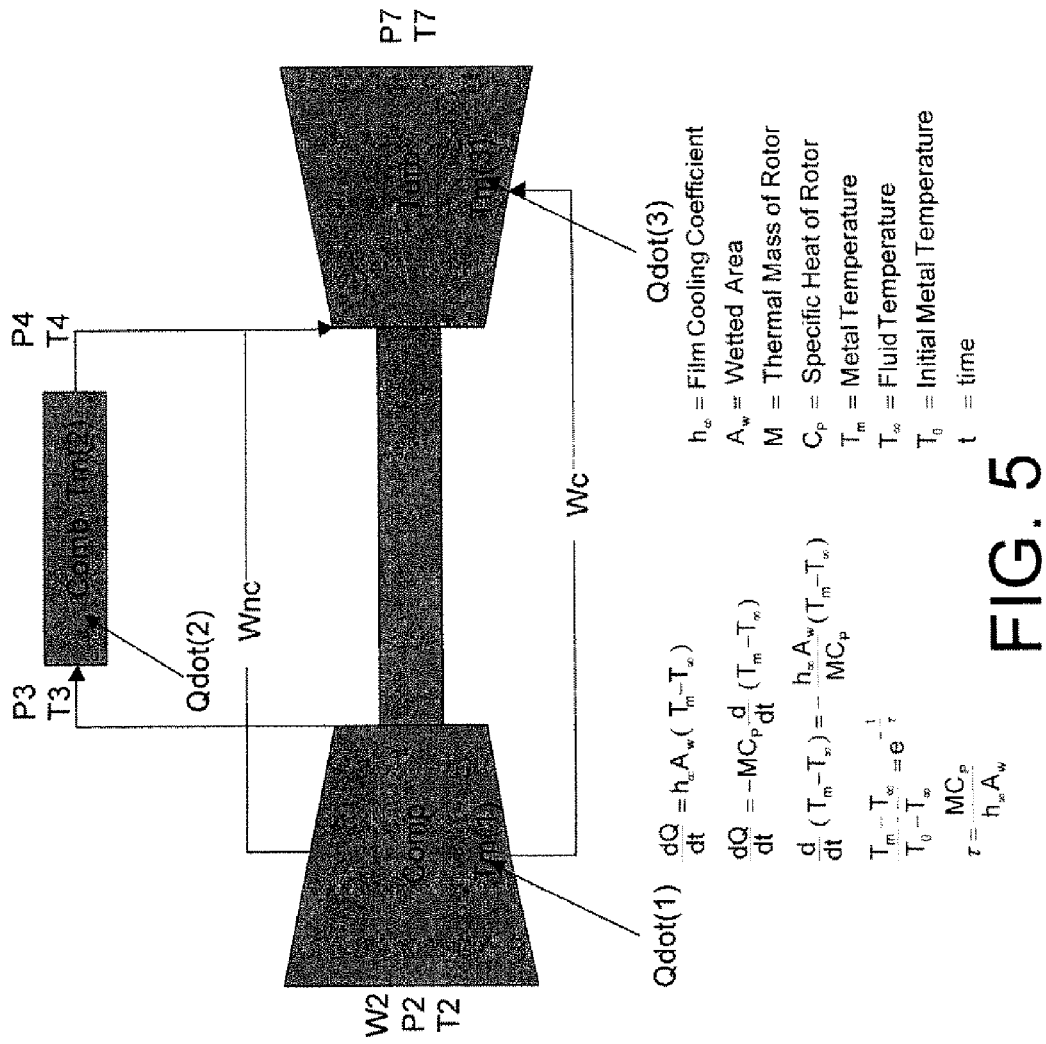

FIGS. 5-6 illustrate a series of heat transfer equations for an example system and model according to an embodiment of the invention.

Figure 7:
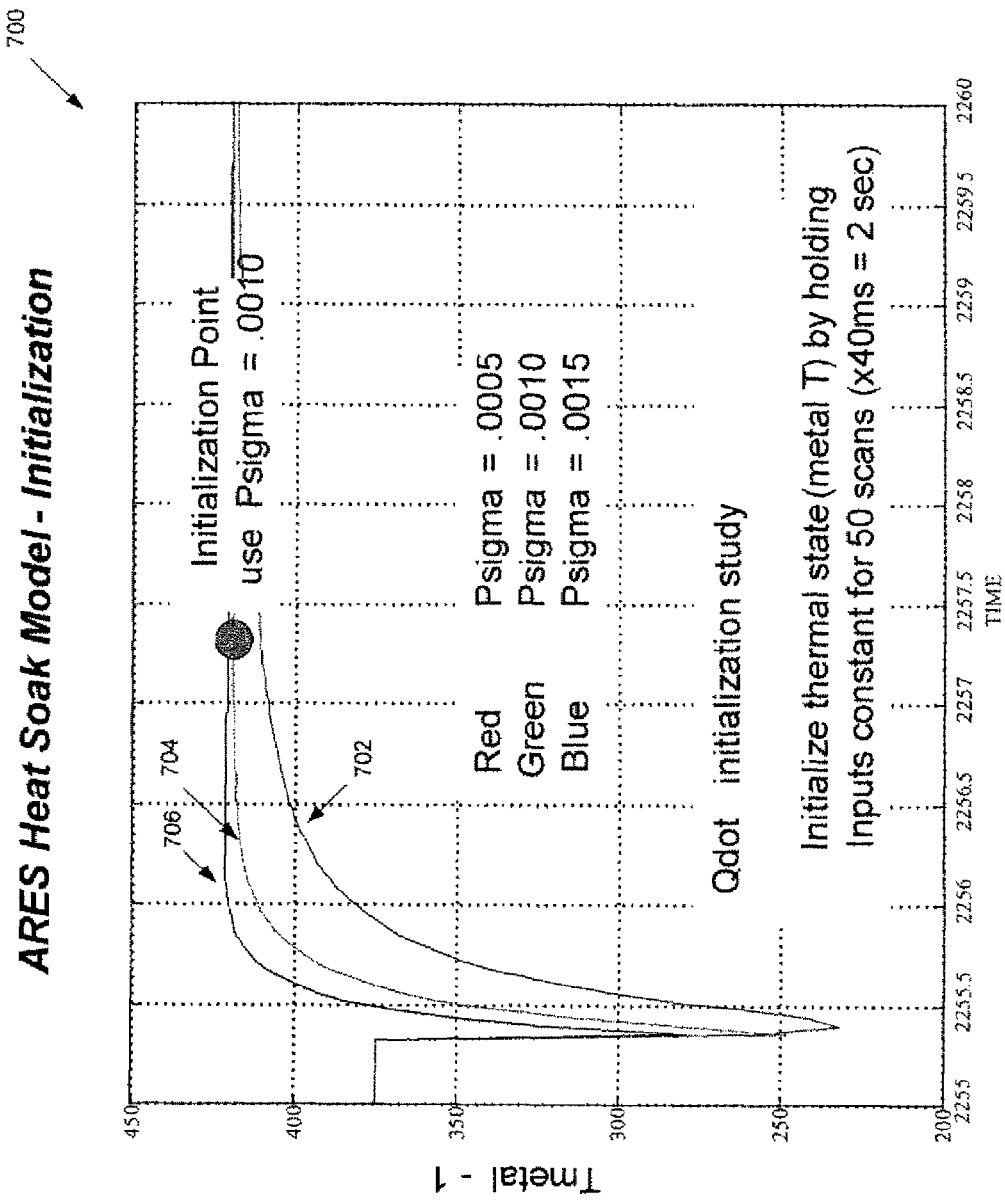
Figure 8:
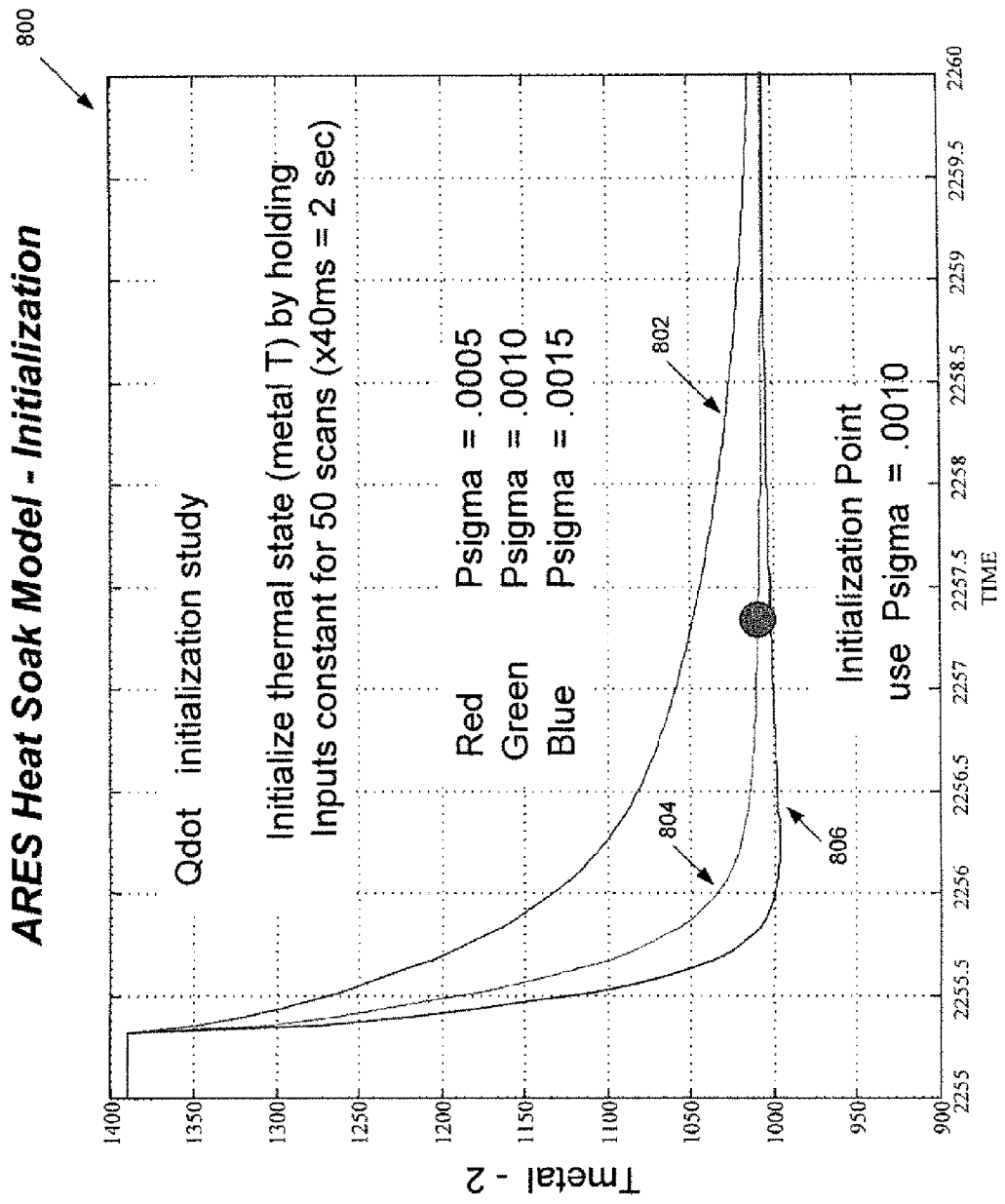
Figure 9:
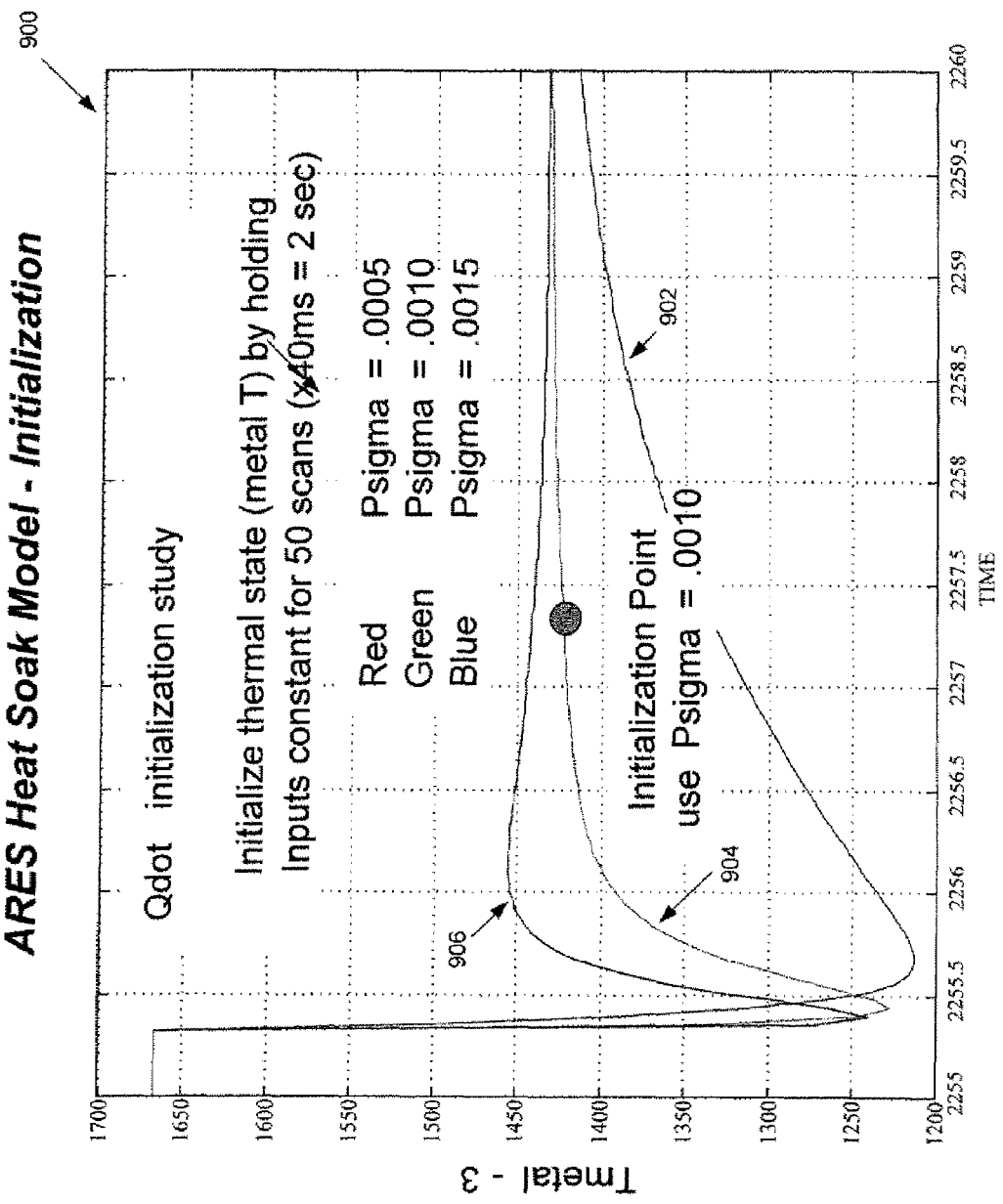
Figure 10:
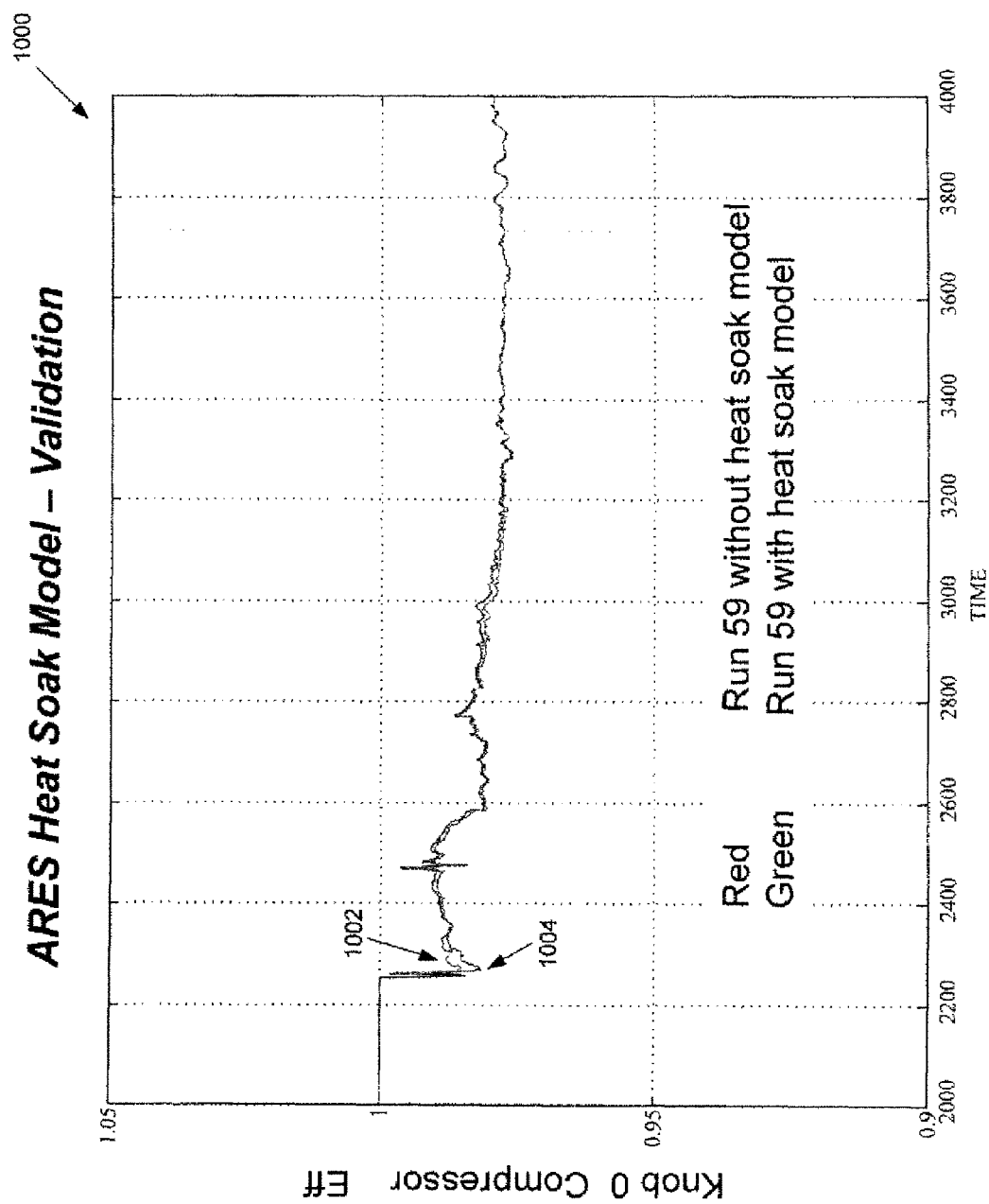
Figure 11:
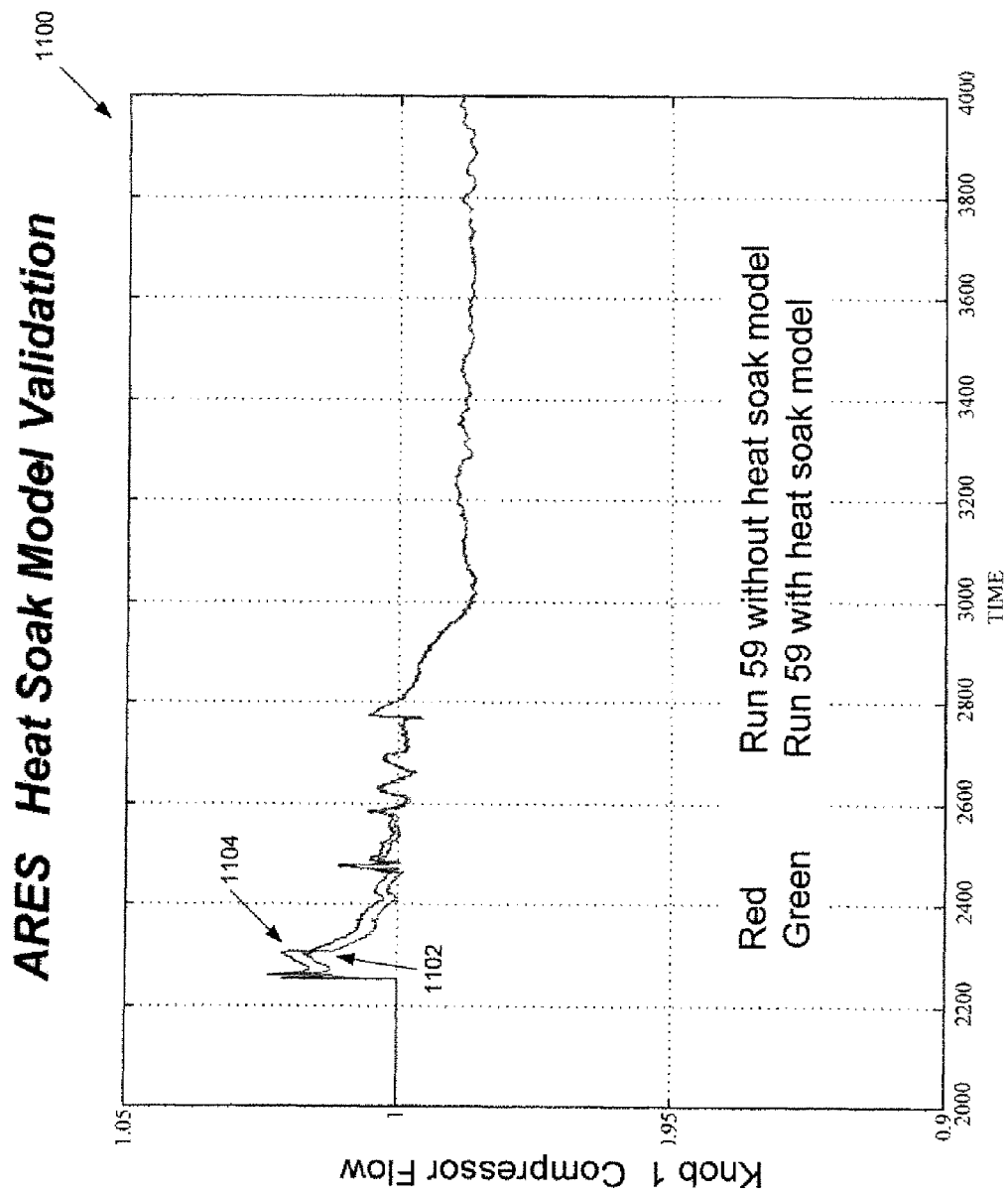
Figure 12:
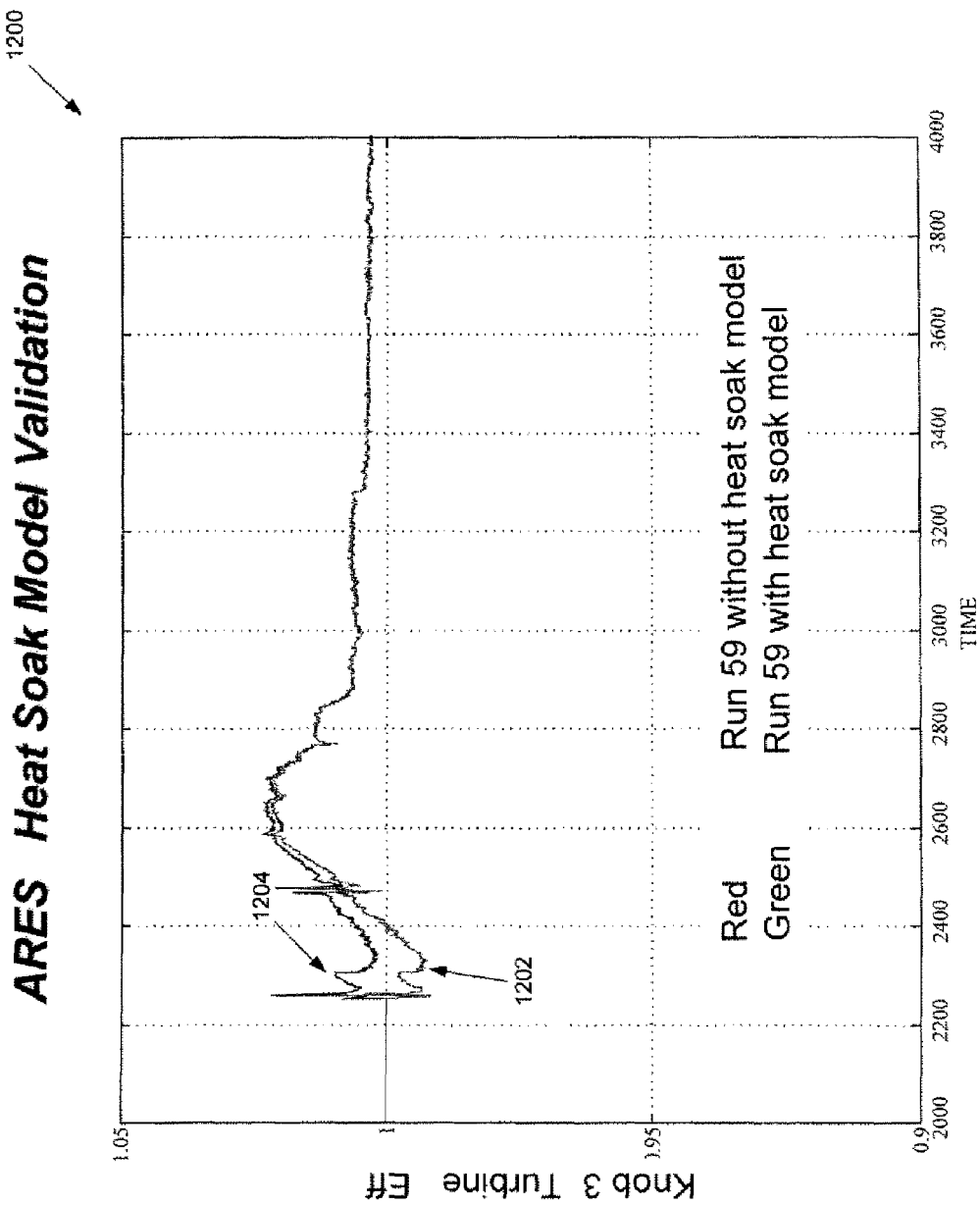
Figure 13:
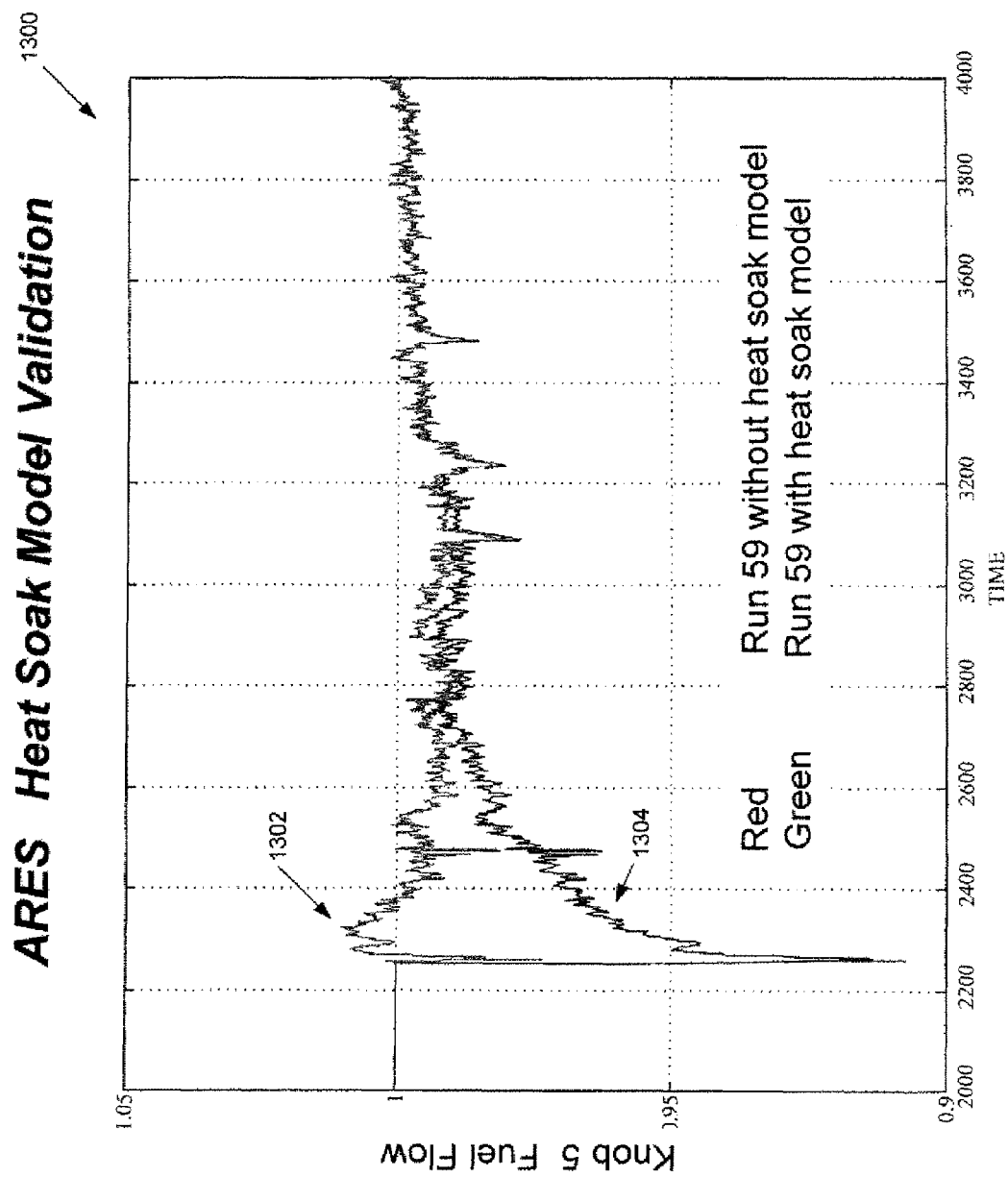

FIGS. 7-9 illustrate initialization phases for example model settings in accordance with embodiments of the invention for operation of selected components of a gas turbine.

FIGS. 10-13 illustrate example comparisons of a gas turbine implementing an embodiment of the inventions and a gas turbine not implementing an embodiment of the invention.

Figure 14:
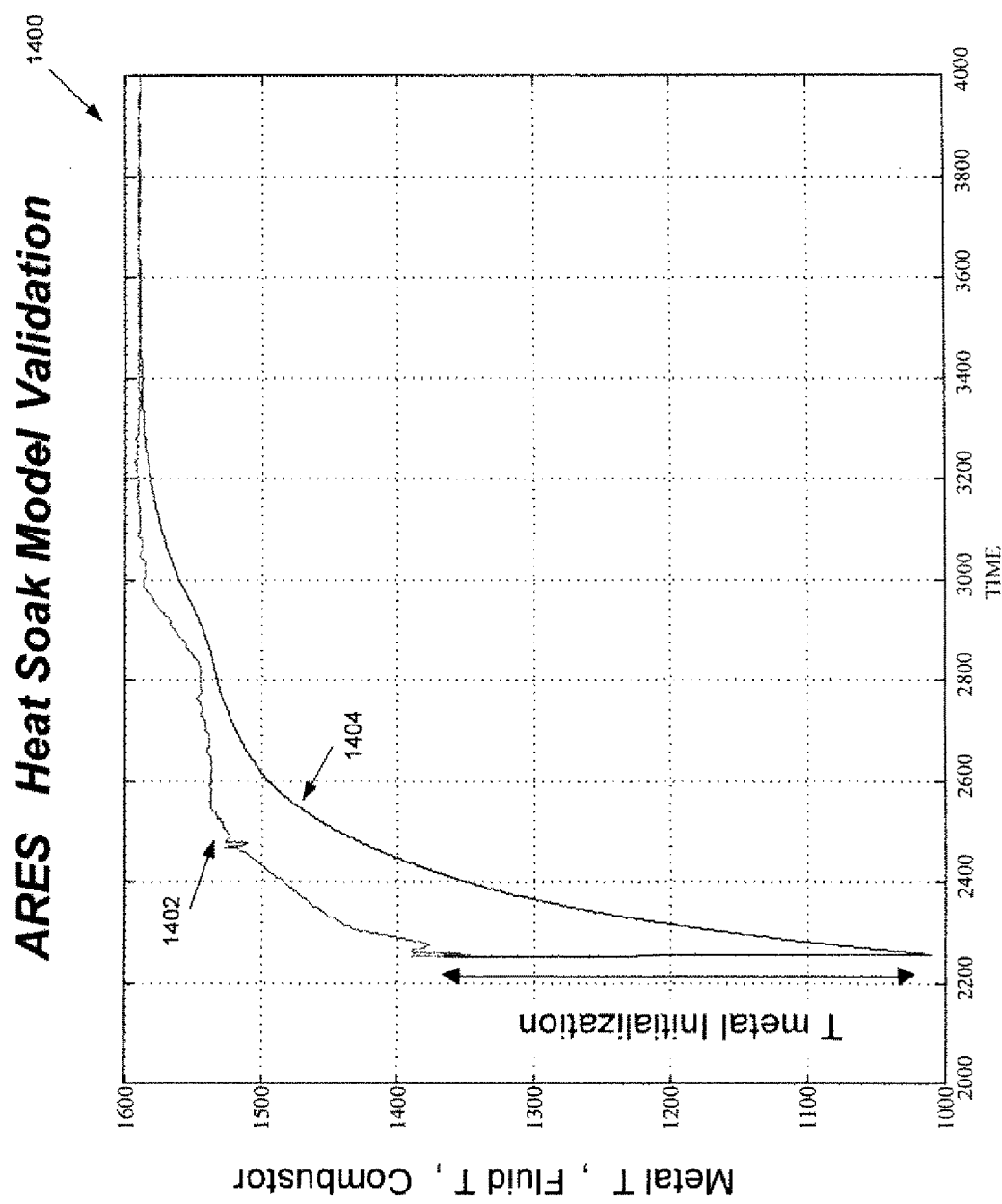
Figure 15:
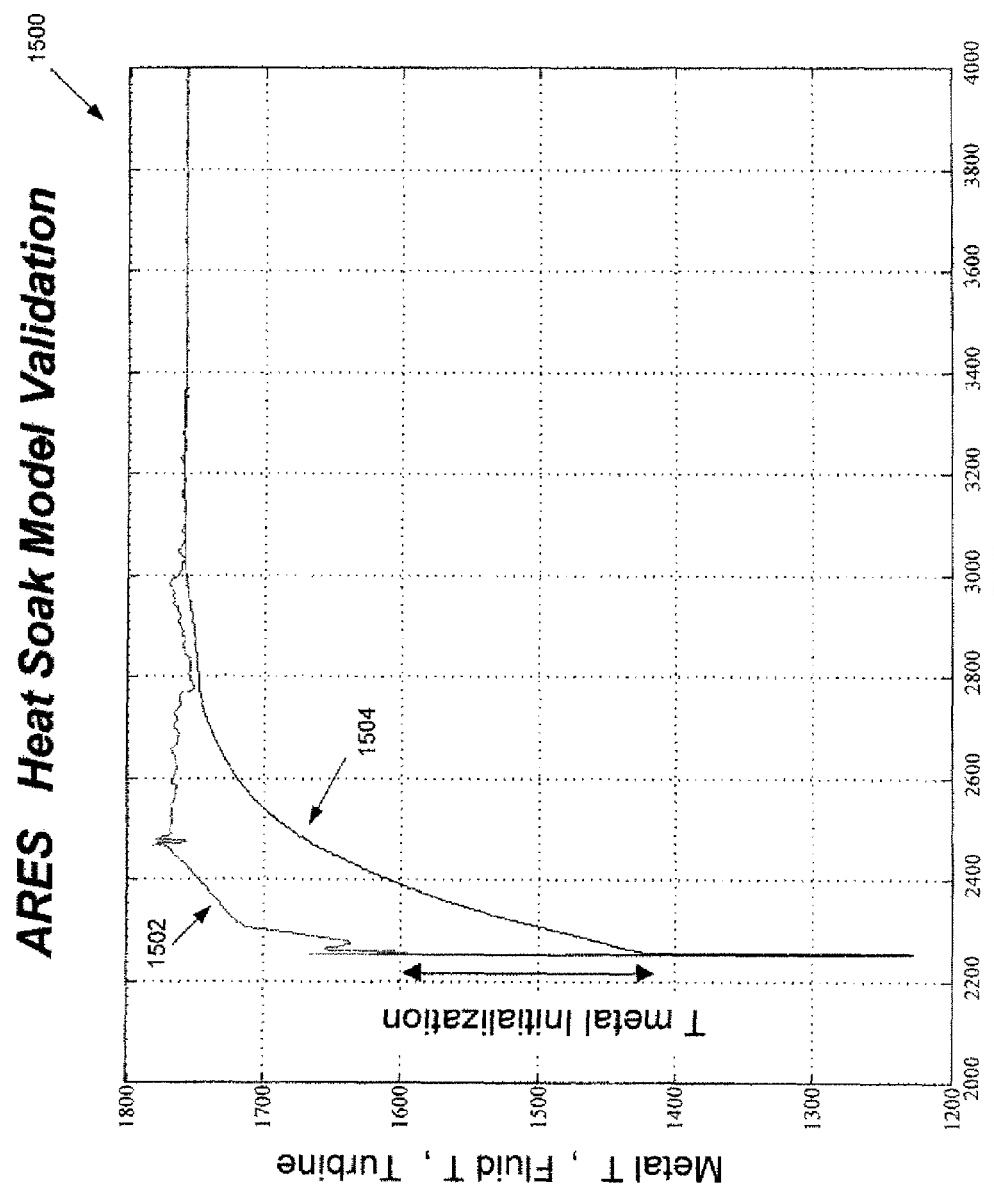

FIGS. 14-15 illustrate example comparisons of a gas turbine implementing an embodiment of the invention.

DETAILED DESCRIPTION OF EMBODIMENTS OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will convey the scope of the invention to those skilled in the art. Like numbers refer to like elements throughout.

Embodiments of the invention are described below with reference to block diagrams and schematic illustrations of methods and systems according to embodiments of the invention. It will be understood that each block of the diagrams, and combinations of blocks in the diagrams can be implemented by computer program instructions. These computer program instructions may be loaded onto one or more general purpose computers, special purpose computers, or other programmable data processing apparatus to produce machines, such that the instructions which execute on the computers or other programmable data processing apparatus create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

In embodiments of this invention, any physical system, control system or property of the engine or engine subsystem may be modeled, including, but not limited to, the engine itself, the gas path and gas path dynamics; actuators, effectors, or other controlling devices that modify or change any engine behavior; sensors, monitors, or sensing systems; the fuel metering system; the fuel delivery system; the lubrication system; and/or the hydraulic system. The models of these components and/or systems may be physics-based models (including their linear approximations). Additionally or alternatively, the models may be based on linear and/or nonlinear system identification, neural networks, and/or combinations of all of these.

Gas turbine engines are air breathing engines that produce work based on the Brayton thermodynamic cycle. Some non-limiting examples of gas turbine engines include: aircraft engines, power systems, propulsion engines for marine applications, turbines used as pumps, turbines used in combined cycle power plants, and turbines used for other industrial applications. In gas turbine engines, thermal energy is drawn from the combustion of fuel with air, the combustion of fuel with an oxidizer, chemical reactions and/or heat exchange with a thermal source. The thermal energy is then converted into useful work. This work can be output in the form of thrust, shaft power or electricity. The performance or operation of these engines is controlled through the use of actuators. Some non-limiting examples of actuators in gas turbine engines include fuel metering valves, inlet guide vanes, variable stator vanes, variable geometry, bleed valves, starter valves, clearance control valves, inlet bleed heat, variable exhaust nozzles, and the like. Some non-limiting examples of sensed engine values include temperatures, pressures, rotor speeds, actuator positions, and/or flows.

One example schematic of an example afterburning gas turbine engine 10 is show in FIG. 1 with station designations 12, sensors 14, and actuators 16, where the actuators can comprise: IGV Inlet Guide Vane; VSV Variable Stator Vane; MFMV Main Fuel Metering Valve; AFMV Afterburning Fuel Metering Valve; and A8 Variable Exhaust Nozzle; and the sensors can comprise: T2 Fan Inlet Temperature; N2 Fan Speed; PS14 Fan Static Exit Pressure; P25 Compressor Inlet Pressure; N25 Core Speed; PS3 Compressor Discharge Static Pressure; and T4B High-pressure Turbine Exit Temperature.

The engine 10 show in FIG. 1 can be an aerodynamically coupled, dual rotor machine wherein a low-pressure rotor system (fan and low-pressure turbine) can be mechanically independent of a high-pressure (core engine) system. Air entering the inlet can be compressed by the fan and then split into two concentric streams. One of these streams can enter the high-pressure compressor and proceed through the main engine combustor, high-pressure turbine, and low-pressure turbine. The other stream can be directed through an annular duct and recombined with the core flow, downstream of the low-pressure turbine, by means of a convoluted chute device. The combined streams can enter the augmenter to a convergent-divergent, variable area exhaust nozzle where the flow can be pressurized, expanded and accelerated rearward into the atmosphere, thereby generating thrust.

The various actuators of the engine 10 can be controlled through actuation inputs from a controller, such as the example model-based predictive control module described below with reference to FIG. 2. The various sensors can provide measured or sensed values of parameters for monitoring and use by one or more systems. For example, the sensed and measured values may be used to estimate values of various performance parameters using a state estimator, as described below with reference to FIG. 2.

It will be understood by those skilled in the art that the embodiments described herein may be applicable to a variety of systems and are not limited to engines or other devices similar to that described in FIG. 1.

Control systems adapted to provide control of such engines have been described in U.S. Pat. No. 6,823,253, entitled "METHODS AND APPARATUS FOR MODEL PREDICTIVE CONTROL OF AIRCRAFT GAS TURBINE ENGINES," filed Nov. 27, 2002; U.S. Pat. No. 6,823,675 B2, entitled "ADAPTIVE MODEL-BASED CONTROL SYSTEMS AND METHODS FOR CONTROLLING A GAS TURBINE," filed Nov. 13, 2002; and U.S. patent application Publication No. 2005/0193739 A1, entitled "MODEL-BASED CONTROL SYSTEMS AND METHODS FOR GAS TURBINE ENGINES", filed Mar. 2, 2004, the contents of each is incorporated herein by reference.

FIG. 2 illustrates a control arrangement implementing an example model according to an embodiment of the invention. The control system 100 shown in FIG. 2 is adapted to monitor and control the physical engine plant or gas turbine engine 10 to provide substantially optimal performance under a variety of conditions. The plant or engine 110 can include sensors which sense or measure values Y of certain parameters. These parameters can include, but are not limited to, fan speed, pressures and pressure ratios, and temperatures. The plant or engine 110 can also include one or more actuators which can be controlled by one or more command inputs U. The plant or engine 110 may be similar to, for example, the engine 10 illustrated in FIG. 1.

The values Y of the sensed or measured parameters are provided to a state estimator 120. The values input to the state estimator 120, such as temperatures, can be used to initialize one or more values in the state estimator 120. The state estimator 120 can include a model 130 of the plant or engine 110. The model 130 can be used by the state estimator 120 to generate one or more state parameters which can include estimates of performance parameters. In a particular embodiment, the model 130 can be an adaptive real-time engine simulation (ARES) implemented with a Kalman filter, described in further detail below with respect to FIGS. 3-4. The ARES can be a model adapted for use with a model based controller for relatively large scale industrial gas turbines. In other embodiments, the model 130 can include a recursive-type filter, a recursive estimator, an adaptive digital-type filter, an extended Kalman filter, or any other filter, algorithm, device or method similar to those described herein.

The state parameters from the state estimator 120 and associated model 130 can be transmitted to a model-based predictive control module or control module 140. The control module 140 can use the state parameters to perform an optimization to determine commands for one or more actuators of the plant or engine 110. For example, the control module 140 can perform an optimization to determine one or more engine control actions and corresponding control commands for one or more actuators of a gas turbine engine. In this regard, the control module 140 can include an optimizer 150 and a model 160. The model 160 associated with the control module 140 may be identical to the model 130 associated with the state estimator 120. Those skilled in the art will recognize that a model can be implemented in either or both the state estimator 120 and control module 140. In a particular embodiment, either or both models 130, 160 can be an adaptive real-time engine simulation (ARES) implemented with a Kalman filter, described in further detail below with respect to FIGS. 3-4. Using either or both of the models 130, 160 allows optimization of the engine 110 to converge rapidly.

In use, embodiments of the invention can be utilized to initialize the models 130, 160 on startup of the plant or engine 110. Furthermore, embodiments of the invention can be utilized to re-initialize the dynamic states of the models 130, 160 after any time of event, such as load rejection or a sensor failure. Other embodiments of the invention can be used to initialize dynamic states of other types of machines or devices in other circumstances.

FIGS. 3 and 4 are block diagrams respectively illustrating an example model during normal execution and during dynamic configuration according to embodiments of the invention. These diagrams illustrate data processing by various modules associated with models 300, 400 such as an adaptive real-time engine simulation (ARES) implemented with a Kalman filter. As shown, the models 300, 400 can include some or all of the following modules in accordance with embodiments of the invention: model block 302; model block 304; model partial derivative block 306; model partial derivative block 308; filter block 310; and heat soak block 312. The module blocks 302, 304, 306, 308, 310, and 312 represent various "run time"-type modules for which various parameters can be input to each of the modules 302, 304, 306, 308, 310, and 312, and respective corresponding outputs can be received from the modules 302, 304, 306, 308, 310, and 312 in accordance with embodiments of the invention. Those skilled in the art will recognize that various inputs and outputs can be configured as data inputs, vectors, matrices, functions, and other mathematical-type devices. In any instance, the models 300, 400 shown can determine model predictions and dynamically tune model predictions to measured performances in a real time environment for a gas turbine engine, such as 10 in FIG. 1, or similar device. The example models 300, 400 can be implemented with the gas turbine engine shown as 10 in FIG. 1, and the system show as 100 in FIG. 2.

FIGS. 3 and 4 show performance parameters 314 input to the models 300, 400. For example, performance parameters 314, labeled as "U bar", can be input to model block 302 and can be further input to model block 304. Suitable performance parameters can include, but are not limited to, sensed or measured performance parameters, including temperatures, pressures, a temperature difference between at least two points in the engine, an exhaust temperature, a compressor exit temperature, or other operating conditions or data. For example, performance parameters can include, but are not limited to, operating data from at least one of the following: an engine, an engine component, an engine system, an engine system component, an engine control system, an engine control system component, a gas path in the engine, gas path dynamics, an actuator, an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault, a mechanical failure, an electrical failure, a chemical failure, mechanical damage, electrical damage, chemical damage, a system fault, a system failure, and system damage. Model block 302 and model block 304 can each be conventional models adapted to simulate the real time performance of an engine or similar device. Each model block 302, 304 can include or otherwise implement one or more algorithms adapted to simulate the real time performance of an engine or similar device.

A respective output 316 from model block 302, and an output 318 from model block 304 can be determined based at least in part on the performance parameters 314. For example, some or all of the performance parameters 314 input to model block 302 can be used to determine a performance output 316, labeled as "y bar hat", and some or all of the performance parameters 314 input to model block 304 can be used to determine a performance output 318, labeled as "y bar hat star". The respective performance outputs 316, 318 from each model block 302, 304 can be vectors which include predicted or expected performance parameters based at least in part on the performance parameters 314 input to each model block 302, 304. In addition to performance output 316 from model block 302, out of phase variables 320, labeled as "opv", can be output for use in subsequent model runs. For example, at any given time, one or more variables used in a matrix in a model, such as in model block 302, may be out of phase by one pass. Such out of phase variables can be used or otherwise modified for use in subsequent model runs.

In the embodiments shown in FIGS. 3 and 4, other inputs to model block 302 can include, but are not limited to, filter adjustments to the model (labeled as "x bar hat") or multipliers 322, and predicted heat transfer 324 of the engine (labeled as "Q dot bar"), each of which is described below. Moreover, another input to model block 1 302 can be out of phase variables (labeled as "opv"), which are described above with respect to 320.

Furthermore, as shown in FIGS. 3 and 4, other inputs to model block 304 can include, but are not limited to, filter adjustments to the model (labeled as "x bar hat star") or multipliers 326, and predicted heat transfer 324 of the engine (labeled as "Q dot bar"), each of which is described below. In addition, another input to model block 304 can be out of phase variables (labeled as "opv"), which are described above with respect to 320.

Turning back to the performance outputs 316, 318 from model blocks 302, 304, these outputs 316, 318 can be respectively input to model partial derivative block 306 and model partial derivative block 308. Model partial derivative block 306 and model partial derivative block 308 can each be conventional models adapted to determine the relative amount of change in model performance with respect to changes in certain input performance parameters. Each model block 306, 308 can include or otherwise implement one or more algorithms adapted to determine the relative amount of change in model performance with respect to changes in certain input performance parameters. For example, each model block 306, 308 can implement a partial derivative of the performance outputs 316, 318, labeled as "y bar hat" and "y bar hat star" respectively, input to each model block 306, 308, With respect to model partial derivative block 306, filter adjustments to the model (labeled as "x bar hat") or multipliers 322 can be input to the model block 306. Based at least in part on the performance output 316 and filter adjustments to the model or multipliers 322 input to model block 306, output 326, labeled as "x bar hat star", from model partial derivative block 306 can be determined. For example, a partial derivative of a vector representing the performance output 316 and filter adjustments to the model or multipliers 322 input to model block 306 can be used to determine output 326, which can be subsequently input to model block 304 as described above. Furthermore, outputs 330, 332, labeled "y bar hat save" and "x bar hat save" respectively, can be determined based at least in part on the performance output 316 and filter adjustments to the model or multipliers 322 input to model block 306. These additional outputs 330, 332 can include filter adjustments to the model or multipliers determined, tracked, or saved from prior model runs. Either or both outputs 330, 332 can be input to model partial derivative block 308.

With reference to model partial derivative block 308, based at least in part on the performance output 318 input to the model block 308, an output 334, labeled as "J" can be determined. As described above, other inputs to model block 308 can include, but are not limited to, outputs 326, 330, and 332, from model block 306, respectively labeled, "x bar hat star", "y bar hat save", and "x bar hat save". Some or all of these inputs 326, 330, and 332 to the model block 308 can be used to determine output 334 from the model block 308. For example, some or all of inputs 318, 326, 330, and 332, can be used to determine a Jacobian matrix of variables, labeled as "J", or a matrix of partial derivatives.

With respect to filter block 310, output 316 from model block 302 can be input to filter block 310. In addition, performance parameters 336 from the engine, such as 10 in FIG. 1, can be input to the filter block 310. The performance parameters can include, but are not limited to, sensed or measured performance parameters. Based at least in part on the output 316 and the performance parameters 336, the filter block 310 can determine one or more adjustments to the model or multipliers 322. Some or all of the adjustments to the model or multipliers 322 can be used as inputs to model block 302, model block 304, model partial derivative block 306, and model partial derivative block 308, as previously described above. The filter block 310 can be a Kalman filter or similar type of filter adapted to dynamically tune one or more model predictions to measured performance of a gas turbine engine or similar device. The filter block 310 can include or otherwise implement one or more algorithms adapted to dynamically tune one or more model predictions to measured performance of a gas turbine engine or similar device.

In the embodiments shown in FIGS. 3 and 4, the filter block 310 can output a covariance output 338. For example, a covariance output can include, but is not limited to, a covariance matrix. In subsequent model runs, a covariance output 338, such as a covariance matrix, can be used as an input to the filter block 310. Furthermore, in subsequent model runs, some or all of the adjustments to the model or multipliers 322 from filter block 310 can be used as an input to the filter block 310.

As shown in FIG. 3 for normal execution of the model 300, heat soak block 312 can receive input from model block 302, such as output 316. For dynamic configuration of the model 400 shown in FIG. 4, heat soak block 312 is shown receiving an additional input from filter block 310, such as output 322. Based in part on either or both of these inputs 316, 322, the heat soak block 312 can determine a heat flux output 324, labeled as "Q dot bar". In addition, the heat soak block 312 can determine metal temperatures 342, labeled as "Tmtl", associated with the gas turbine engine or similar device of interest. In subsequent model runs the heat flux output 324 can be used as an input to model blocks 302, 304, as described above.

In use, some or all of the above processes and instructions can be used, and repeated as needed, to automatically and dynamically configure a filter, such as a Kalman filter, during model execution to determine the state of the heat flux model at any particular time. In this manner, the filter can be configured to "tune" the initial state of the heat flux model to match measured performance of the gas turbine engine or other device of interest.

In one aspect of the invention, one or more relaxation factors, such as adjustments to the model or multipliers 322, can be utilized to achieve heat flux tuning in approximately 50 scans or model runs at approximately a 25 Hertz scan rate, or within approximately 2 seconds.

In another aspect of the invention, the initial state of the heat flux model is initialized by setting metal temperatures associated with the gas turbine engine to be consistent with calculated heat flux.

In yet another aspect of the invention, some or all of the above processes and instructions can be used to automatically and dynamically configure a filter, such as a Kalman filter, during model execution to determine the state of another set of dynamic-type performance parameters at any particular time.

FIGS. 5 and 6 illustrate a series of example heat transfer equations for an example system and associated model according to one embodiment of the invention. As shown in FIG. 5, conventional heat transfer and convection variables and equations for a mass in an immersed fluid can be used in a model, such as an ARES heat soak model, similar to a model implemented by heat soak block 312 in FIG. 3. For instance, some or all of the following variables can be used for an example system and associated model according to one embodiment of the invention.

(1) $h_\infty$=Film Cooling Coefficient
(2) $A_W$=Wetted Area
(3) M=Thermal Mass of Rotor
(4) $C_P$=Specified Heat of Rotor
(5) $T_M$=Metal Temperature
(6) $T_\infty$=Fluid Temperature
(7) $T_0$=Initial Metal Temperature
(8) t=time By way of further example, some or all of the following equations can be used for an example system and associated model according to one embodiment of the invention.

(1) $dQ/dt=h_\infty A_W(T_M-T_\infty)$
(2) $dQ/dt=-MC_P d/dt(T_M-T_\infty)$
(3) $d/dT(T_M-T_\infty)=-(h_\infty A_W/M\ C_P)(T_M-T_\infty)$
(4) $(T_M-T_\infty)/(T_0-T_\infty)=e^{-(t/\tau)}$
(5) $\tau=M\ C_P/h_\infty A_W$ Other embodiments of the invention can implement any of the above variables or equations, and may also include other variables and equations for other types of models not limited to heat transfer, convection, or heat soak models.

For the initialization of a heat soak model in accordance with an embodiment of the invention, the following variables and equations can be implemented.

(1) $\tau_{ref}$=Time Constant for Each Thermal Node (for example, 3 nodes)
(2) $hA_{ref}$=Convection Cooling Coefficient×Wetted Area at Reference Conditions
(3) $tf_{ref}$=Fluid (Gas Path) Temperatures at Reference Conditions
(4) $wf_{ref}$=Mass Flow at Reference Conditions
(5) $T_0$=Initial Metal Temperature
(6) Tf=Measured Fluid Temperature
(7) $hA/hA_{ref}=(w/w_{ref})^{0.80}(tf/tf_{ref})^{0.84}$
(8) $\tau/\tau_{ref}=hA_{ref}/hA$
(9) $T_0=T_f+Qdot/hA$ By way of example, variables (1)-(4) can be reference input variables. Using equations (7) and (8), the variables hA and τ can be sealed to particular reference conditions. In equation (9), the initial metal temperature $T_0$ can be solved for or otherwise initialized by tuning Q dot while holding the input constant.

In one aspect of an embodiment, initialization of the initial metal temperature can be optimized within approximately 50 scans or model runs at approximately a 25 Hertz scan rate, or within approximately 2 seconds.

FIGS. 7-9 illustrate response rates for systems and models performing heat transfer (Q dot) initialization with three different gas turbine engine components, a compressor, a combustor, and a turbine, in accordance with embodiments of the invention. In all three Figures, three different implementations of a system and model in accordance with embodiments of the invention are shown to illustrate the different response rates between system implementations. The graphs 700, 800, 900 each show time versus metal temperatures for each of the three gas turbine engine components. Essentially, these graphs 700, 800, 900 illustrate the thermal state of three gas turbine engine components, which collectively, can substantially describe the thermal state of the gas turbine engine.

FIG. 7 illustrates an initialization phase for example filter settings for a compressor in accordance with an embodiment of the invention. The graph 700 shown illustrates a system 702 with a Psigma value of approximately 0.0005, a system 704 with a Psigma value of approximately 0.0010, and a system 706 with a Psigma value of approximately 0.0015. As shown, the system 702 with the relatively lower Psigma value has a relatively slow response rate. In contrast, the system 706 with a relatively high Psigma value has a relatively quick response rate, and is relatively unstable. Compared to systems 702 and 706, system 704 with an intermediate Psigma value has a response rate between systems 702, 706. In this example, a Psigma value of approximately 0.0010 is suitable for a system and model in accordance with an embodiment of the invention, and implemented with the particular equipment in this example. In this manner, an operator or user can determine optimal settings for a filter to ensure that the particular filter relaxation is not underdamped or overdamped for the particular dynamic state of interest.

FIG. 8 illustrates an initialization phase for example filter settings for a combustor in accordance with an embodiment of the invention. The graph 800 shown illustrates a system 802 with a Psigma value of approximately 0.0005, a system 804 with a Psigma value of approximately 0.0010, and a system 806 with a Psigma value of approximately 0.0015. As shown, the system 802 with the relatively lower Psigma value has a relatively slow response rate. In contrast, the system 806 with a relatively high Psigma value has a relatively quick response rate, and is relatively unstable. Compared to systems 802 and 806, system 804 with an intermediate Psigma value has a response rate between systems 802, 806. In this example, a Psigma value of approximately 0.0010 is suitable for a system and model in accordance with an embodiment of the invention, and implemented with the particular equipment in this example. In this manner, an operator or user can determine optimal settings for a filter to ensure that the particular filter relaxation is not underdamped or overdamped for the particular dynamic state of interest.

FIG. 9 illustrates an initialization phase for example filter settings for a turbine in accordance with an embodiment of the invention. The graph 900 shown illustrates a system 902 with a Psigma value of approximately 0.0005, a system 904 with a Psigma value of approximately 0.0010, and a system 906 with a Psigma value of approximately 0.0015. As shown, the system 902 with the relatively lower Psigma value has a relatively slow response rate. In contrast, the system 906 with a relatively high Psigma value has a relatively quick response rate, and is relatively unstable. Compared to systems 902 and 906, system 904 with an intermediate Psigma value has a response rate between systems 902, 906. In this example, a Psigma value of approximately 0.0010 is suitable for a system and model in accordance with an embodiment of the invention, and implemented with the particular equipment in this example. In this manner, an operator or user can determine optimal settings for a filter to ensure that the particular filter relaxation is not underdamped or overdamped for the particular dynamic state of interest.

FIGS. 10-13 illustrate example field comparisons of a gas turbine model implementing an embodiment of the invention, and a gas turbine model not implementing an embodiment of the invention. The graphs 1000, 1100, 1200, 1300 show time versus multipliers from the Filter Block 322 (FIG. 3) for various gas turbine engine components. A value of approximately 1.00 on the left hand axis represents optimal model prediction for the particular component. In each of these Figures, the curves 1002, 1102, 1202, 1302 which are relatively vertically closer to left hand axis value of approximately 1.00 represent the operation of a gas turbine model implementing a heat soak model in accordance with an embodiment of the invention. In contrast, the curves 1004, 1104, 1204, 1304 which are relatively vertically further from the left hand axis value of approximately 1.00 represent the operation of the gas turbine model not implementing a heat soak model in accordance with an embodiment of the invention. As shown by a comparison of these curves, the relative effectiveness of the example model in accordance with an embodiment of the invention is pronounced.

FIGS. 14-15 illustrate example field comparisons of a gas turbine model implementing an embodiment of the invention. The graphs 1400, 1500 show time versus metal and fluid temperatures. In both of these Figures, the curves 1402, 1502 show time versus the fluid temperature and the curves 1404, 1504 show time versus the metal temperature. As shown by the comparison of these curves, the initialization of the metal temperatures effected by an embodiment of the invention accounts for a significant temperature difference which would otherwise result in erroneous heat flux calculations 324 (FIG. 3) from the adaptive real-time engine simulation model.

Many modifications and other embodiments of the inventions set forth herein will come to mind to one skilled in the art to which these inventions pertain having the benefit of the teachings presented in the foregoing descriptions and the associated drawings. Thus, it will be appreciated by those of ordinary skill in the art that the invention may be embodied in many forms and should not be limited to the embodiments described above. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for controlling a gas turbine engine, the method comprising:
   (i) obtaining dynamic-type information associated with a current state of an engine; and
   (ii) initializing an engine model with at least a portion of the dynamic-type information, wherein a Kalman filter is used to initialize the portion of the dynamic-type information, wherein at least one value based on the processed dynamic-type information is input to the engine model for determining an engine control action.

2. The method of claim 1, wherein the dynamic-type information comprises at least one of the following: a temperature, a pressure, a temperature difference between at least two points in the engine, exhaust temperature, or compressor exit temperature.

3. The method of claim 1, wherein obtaining dynamic-type information associated with a current state of an engine comprises obtaining information about at least one of: the engine, an engine component, an engine system, an engine system component, an engine control system, an engine control system component, a gas path in the engine, gas path dynamics, an actuator, an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault, a mechanical failure, an electrical failure, a chemical failure, mechanical damage, electrical damage, chemical damage, a system fault, a system failure, and system damage.

4. The method of claim 1, wherein the engine model comprises an adaptive real-time engine simulation model.

5. The method of claim 1, wherein initializing an engine model with at least a portion of the dynamic-type information comprises inputting at least one measured performance value to the engine model.

6. The method of claim 1, wherein the Kalman filter is dynamically configured during model execution.

7. The method of claim 1, further comprising: repeating steps (i) through (ii), wherein additional dynamic-type information is input to the engine model to improve engine control.

8. The method of claim 1, wherein the method is performed automatically by a computer.

9. A system for controlling a gas turbine engine, the system comprising:
   at least one sensor adapted to obtain dynamic-type information about a current state of the engine;
   an engine model adapted to receive information from the at least one sensor, and further adapted to reflect the current state of the engine; and
   a Kalman filter adapted to initialize the engine model with at least a portion of the dynamic-type information, wherein at least one value based on the processed dynamic-type information is input to the engine model to determine an engine control action.

10. The system of claim 9, wherein the dynamic-type information comprises at least one of the following: a temperature, a pressure, a temperature difference between at least two points in the engine, exhaust temperature, or compressor exit temperature.

11. The system of claim 9, wherein the dynamic-type information about a current state of the engine comprises information about at least one of: the engine, an engine component, an engine system, an engine system component, an engine control system, an engine control system component, a gas path in the engine, gas path dynamics, an actuator, an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault, a mechanical failure, an electrical failure, a chemical failure, mechanical damage, electrical damage, chemical damage, a system fault, a system failure, and system damage.

12. The system of claim 9, wherein the engine model comprises an adaptive real-time engine simulation model.

13. The system of claim 9, wherein the Kalman filter is dynamically configured during model execution.

14. The system of claim 9, wherein the at least one value based on the dynamic-type information comprises at least one measured performance value.

15. The system of claim 9, wherein additional dynamic-type information is input to the engine model to improve engine control.

16. The system of claim 9, wherein the model is automatically implemented by a computer.

17. A control system for a gas turbine engine, the control system comprising:
   a computer for implementing at least one engine model; at least one engine model adapted to represent performance of a the gas turbine engine; and
   at least one Kalman filter to initialize the model with filtered dynamic-type information; wherein the filtered dynamic-type information can facilitate at least one control command to the gas turbine engine.

18. The system of claim 17, wherein the filtered dynamic-type information comprises at least one of the following: a temperature, a pressure, a temperature difference between at least two points in the engine, exhaust temperature, or compressor exit temperature.

19. The system of claim 17, wherein the filtered dynamic-type information comprises information about at least one of: the engine, an engine component, an engine system, an engine system component, an engine control system, an engine control system component, a gas path in the engine, gas path dynamics, an actuator, an effector, a controlling device that modifies engine behavior, a sensor, a monitor, a sensing system, a fuel metering system, a fuel delivery system, a lubrication system, a hydraulic system, engine-to-engine variation, deterioration, a mechanical fault, an electrical fault, a chemical fault, a mechanical failure, an electrical failure, a chemical failure, mechanical damage, electrical damage, chemical damage, a system fault, a system failure, and system damage.

20. The system of claim 17, wherein the model comprises an adaptive real-time engine simulation model.

21. The system of claim 17, wherein additional dynamic-type information is input to the engine model to improve engine control.

22. The system of claim 17, wherein the Kalman filter is dynamically configured during model execution.

23. The system of claim 17, wherein the control system is automatically implemented by a computer.

* * * * *

UNITED STATES PATENT AND TRADEMARK OFFICE
CERTIFICATE OF CORRECTION

Page 1 of 1

PATENT NO. : 7,853,392 B2
APPLICATION NO. : 11/627534
DATED : December 14, 2010
INVENTOR(S) : Healey et al.

It is certified that error appears in the above-identified patent and that said Letters Patent is hereby corrected as shown below:

Column 14, Line 15 – after "of" delete "a"

Signed and Sealed this
First Day of February, 2011

David J. Kappos
*Director of the United States Patent and Trademark Office*